No. 874,604.  PATENTED DEC. 24, 1907.
E. W. LEWIS & J. S. UNGER.
METHOD OF FINISHING ARMOR PLATE.
APPLICATION FILED MAY 19, 1903.

WITNESSES

INVENTORS

UNITED STATES PATENT OFFICE.

EDWIN W. LEWIS AND JOHN S. UNGER, OF MUNHALL, PENNSYLVANIA, ASSIGNOR TO CARNEGIE STEEL COMPANY, OF PITTSBURG, PENNSYLVANIA, A CORPORATION OF NEW JERSEY.

METHOD OF FINISHING ARMOR-PLATE.

No. 874,604.

Specification of Letters Patent.

Patented Dec. 24, 1907.

Application filed May 19, 1903. Serial No. 157,766.

*To all whom it may concern:*

Be it known that we, EDWIN W. LEWIS and JOHN S. UNGER, both of Munhall, Allegheny county, Pennsylvania, have invented a new and useful Method of Finishing Armor-Plate, of which the following is a full, clear, and exact description, reference being had to the accompanying drawings, forming part of this specification, in which—

Figure 1:
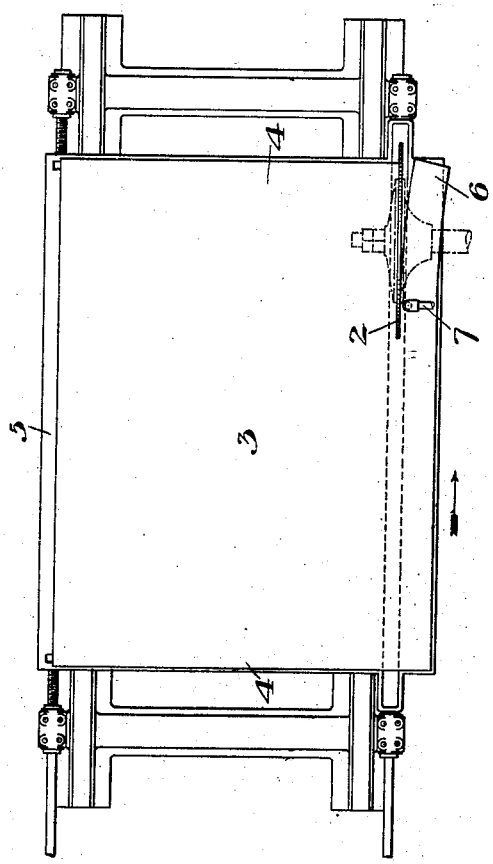
Figure 2:
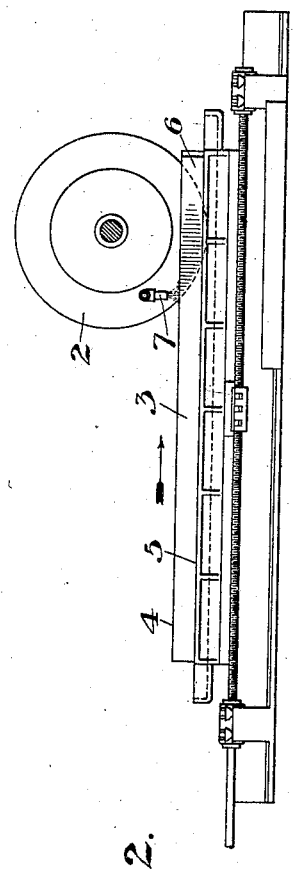

Figure 1 is a plan view of one form of apparatus arranged to carry out our invention, and Fig. 2 is a side elevation of the same.

Our invention relates to the finishing of face-hardened armor plate, and is designed to reduce the amount of time and labor necessary in finishing such plates.

Heretofore in the making of such material the steel ingot has been forged down to a size larger than that of the final plate, and the face then carburized by the Harvey method of cementation or other desirable step. The carbon content of the face portion is thus increased and after the plate has been forged, if the forging step is used after harveyizing, a plate of the desired shape and size is laid out on the rough plate and cut out slightly larger than the final size by a slow moving reciprocating tool, such as a planer. The plate, which is now slightly larger than its final size, is then heated and water-quenched, thus making the carburized face portion of glassy hardness; and to finish the plate to the exact form desired, it is turned over with the hardened face down and is cut with a reciprocating or slow moving cutter through the softer back and down to the cemented and water-quenched portion. This portion cannot be worked by any ordinary cutting tool, and in practice is cut away by the slow grinding action of an emery wheel. These two cutting operations, one before the water-quenching and one after the water-quenching, have been necessary because no ordinary cutting tool will act upon the glass-hard water-quenched portion, and hence this face portion is brought to nearly the final form before water-quenching, and then finished to final form by grinding. The action of cutting tools upon the carburized face is slow and difficult, even before water-quenching, and the expense of finishing the plates has been great.

In finishing armor plate according to our invention, one of the steps of cutting the plate is carried out by cold sawing. We have found that this non-homogeneous face-hardened plate may be sawed by the use of a cold saw, the sticking and stopping of the saw in the kerf being prevented by bending away the part being cut off, from the saw, to prevent pinching it.

The process may be used in different ways; for example the plate, after carburizing, and before liquid-quenching, may be cold-sawed to nearly its final form; and after reheating and liquid-quenching the plate may then be again cold-sawed in a similar manner into the final form; or the plate, after carburizing and before liquid quenching, may be rough sawed with a cold saw to nearly its final form, and after reheating and liquid quenching it may be finished by the old method of cutting through the back with a slow moving tool and then grinding away the strip of hardened face; or, as a third variation, the plate may be roughed out after carburizing and before water-quenching by ordinary slow moving tools; and after reheating and liquid-quenching it may be finished to final form by cold sawing.

In all three cases the step of cold sawing replaces one of the old cutting steps, and as it may be carried out in much less time than the old step, a corresponding reduction in time and expense is obtained.

In the drawings, in which we show one form of apparatus for carrying out the cold sawing steps, 2 represents the saw, 3 the plate to be cut, having the harveyized and water-hardened face-portion 4; 5 is the moving table carrying the plate, 6 is the strip or piece being cut from the plate, and 7 designates a nozzle through which water is discharged against the strip or piece being cut from the plate.

In using the apparatus the table is fed progressively toward the saw in the direction of the length of the cut, and the saw is revolved at a rate of peripheral speed of preferably four or five miles per minute, though the speed may be varied as desired. The binding of the saw in the kerf is prevented by a stream of water directed against the piece being cut from the plate, thus causing it to bend outwardly, and preventing pinching.

The advantages of our invention result from replacing one of the steps of cutting by a slow moving tool, with the step of cutting by the cold saw, thus reducing the time, labor and expense.

Variations in the method may be made other than those referred to, and many variations may be made in the form and arrangement of the sawing apparatus, without departing from our invention.

We claim:

1. The method of finishing armor plate, consisting in carburizing its face and liquid-hardening the same, subjecting the plate to two cutting operations, one before and one after liquid quenching, and cold sawing the plate in carrying out the latter step; substantially as described.

2. The method of finishing armor plate, consisting in carburizing the face of the plate, rough cutting the plate, water-hardening the carburized face, and then cold sawing the plate to final form; substantially as described.

In testimony whereof, we have hereunto set our hand.

EDWIN W. LEWIS.
JOHN S. UNGER

Witnesses:
L. M. REDMAN,
H. M. CORWIN.